United States Patent
Zimmermann et al.

(10) Patent No.: US 9,815,196 B2
(45) Date of Patent: Nov. 14, 2017

(54) APPARATUS AND METHOD FOR RECORDING POSITIONS

(71) Applicant: KUKA Roboter GmbH, Augsburg (DE)

(72) Inventors: Uwe Zimmermann, Augsburg (DE); Günter Schreiber, Friedberg (DE)

(73) Assignee: KUKA Roboter GmbH, Augsburg (DE)

( * ) Notice: Subject to any disclaimer, the term of this patent is extended or adjusted under 35 U.S.C. 154(b) by 42 days.

(21) Appl. No.: 14/961,054

(22) Filed: Dec. 7, 2015

(65) Prior Publication Data
US 2016/0176046 A1    Jun. 23, 2016

(30) Foreign Application Priority Data
Dec. 23, 2014   (DE) .................... 10 2014 226 933

(51) Int. Cl.
*B25J 9/16*   (2006.01)
*G05B 19/425*   (2006.01)

(52) U.S. Cl.
CPC .......... *B25J 9/1633* (2013.01); *B25J 9/1674* (2013.01); *B25J 9/1694* (2013.01); *G05B 19/425* (2013.01); *G05B 2219/36425* (2013.01); *G05B 2219/39319* (2013.01)

(58) Field of Classification Search
None
See application file for complete search history.

(56) References Cited

U.S. PATENT DOCUMENTS

| 4,403,281 A | * | 9/1983 | Holmes | B25J 9/161 |
| | | | | 318/568.18 |
| 4,420,812 A | * | 12/1983 | Ito | G05B 19/4182 |
| | | | | 318/573 |
| 4,482,968 A | | 11/1984 | Inaba | |
| 4,694,230 A | * | 9/1987 | Slocum | B66B 9/02 |
| | | | | 318/568.17 |
| 5,341,459 A | * | 8/1994 | Backes | B25J 9/1661 |
| | | | | 700/260 |

(Continued)

FOREIGN PATENT DOCUMENTS

EP    2194434    6/2010

OTHER PUBLICATIONS

The European Search Report from EPO in related European Appl. No. 15195438.5, dated Jun. 1, 2016.

(Continued)

*Primary Examiner* — Ryan Rink

(57) ABSTRACT

An apparatus for recording positions in a control program of a manipulator, which includes a manipulator, a controller having a control program, and a manual control device, wherein the controller can actuate the manipulator 10 in a compliance control, in which the manipulator is allowed to occupy an actual position different to the nominal position, wherein the controller, when recording the current position of the manipulator in the control program, carries over into the control program in a situation-based manner the nominal position, the actual position or a hybrid position comprising nominal and actual components of the current position. In addition, a corresponding method is also disclosed.

16 Claims, 2 Drawing Sheets

(56) References Cited

U.S. PATENT DOCUMENTS

| | | | |
|---|---|---|---|
| 5,479,078 A * | 12/1995 | Karakama | G05B 19/425 |
| | | | 318/568.13 |
| 6,088,628 A | 7/2000 | Watanabe et al. | |
| 6,212,443 B1 | 4/2001 | Nagata et al. | |
| 8,121,731 B2 * | 2/2012 | Ban | B25J 9/1656 |
| | | | 700/245 |
| 8,423,188 B2 | 4/2013 | Tsusaka et al. | |
| 8,600,555 B2 * | 12/2013 | Nihei | B25J 9/1664 |
| | | | 700/186 |
| 2005/0027398 A1 | 2/2005 | Tokutake et al. | |
| 2009/0105880 A1 * | 4/2009 | Okazaki | B25J 9/1633 |
| | | | 700/258 |
| 2009/0125146 A1 * | 5/2009 | Zhang | B25J 9/1664 |
| | | | 700/253 |
| 2010/0312392 A1 | 12/2010 | Zimmermann | |
| 2012/0143371 A1 | 6/2012 | Selnes et al. | |
| 2012/0239193 A1 | 9/2012 | Mizutani | |
| 2014/0276953 A1 * | 9/2014 | Swarup | B25J 18/007 |
| | | | 606/130 |
| 2015/0217445 A1 * | 8/2015 | Hietmann | B25J 9/0081 |
| | | | 700/264 |

OTHER PUBLICATIONS

Examination Report from GPTO in DE Appl. No. 10 2014 226 933.4, dated Jul. 27, 2015.

* cited by examiner

APPARATUS AND METHOD FOR RECORDING POSITIONS

This application claims the benefit of priority under 35 §119(a) to German Patent Application No. 10 2014 226 933.4, filed on Dec. 23, 2014.

TECHNICAL FIELD

The present invention relates to an apparatus and a method for recording positions in a control program of a manipulator.

PRIOR ART

In the context of robot programming, it is often necessary to record the current position of a specific reference point of the manipulator in a control program of a manipulator, for example, the current position of the tool zero point (TCP). This can take place either in the context of the reprogramming of control programs ("teaching") or in the modification, adaptation or optimization of control programs. Since this involves overwriting of any already existing position information, the recording of positions by the control program is also referred to as a so-called "touch-up".

A position defines a reference point, for example, of the TCP in space, and comprises both the information about the spatial position as well as the information about the spatial orientation of the corresponding point. The position can thus also be described as the placement of the reference point.

The recording of positions in program points of a control program, particularly in the LIN, PTP and CIRC movement commands, is currently carried out in the position control on the basis of the "nominal position". This takes place on the basis of the reproducibility of the recorded position. Any control errors become apparent in the position recording to approximately the same extent as in the subsequent program execution, meaning that the absolute position error is minimized. The nominal position itself is entered into in teaching or touch-up with the so-called "manual method" using the control keys or a space mouse on a manual control device.

Modern robot systems, in particular lightweight robots (LWR), can also be operated in a gravity compensation mode, in which the manipulator is actuated in such a way that it compensates for its own weight force. The manipulator then outwardly behaves as if it were virtually weightless and can be moved, for example, manually, into the desired position. The manipulator is thus moved by means of direct contact with the user, with the keys and the space mouse of a manual control device having no effect. In the gravity compensation mode, the recording of positions is carried out on the basis of the "actual position". Thus in the teaching or touch-up, only the actual position measured by the manipulator itself is recorded, since no nominal position exists and nor can one be calculated.

In the manual movement, the controller can also define a so-called "subspace" of the movement, which limits the movement. This means that the manual movement of the manipulator cannot occur freely in space, instead the robot system enables only certain movement options, and the movement options are otherwise limited. This is thus also referred to as so-called "virtual fixtures," by means of which the movement is restricted. For example, the spatial orientation of the TCP in the space can be defined as a subspace. It is then possible to manually change the spatial position of the TCP, by moving the manipulator accordingly in the X, Y and Z directions. The orientation, i.e. the values of the solid angle A, B and C about the Z, Y and X axes, of the TCP is however always maintained constant by the controller. In further examples, a specific movement path in space for the TCP could be defined as a subspace by the controller. The manipulator could then be manually moved only along this path. The TCP is then always situated on the defined movement path. Thus, for spot welding tasks, for example, a movement path can be preprogrammed on which the weld points must lie, with the exact position of the weld points being set in the teaching or touch-up by the user by means of manual movement of the manipulator. In other examples, the subspace could define a manual movement of the TCP only in one area, one plane, one sub-region, along a straight line, etc.

Modern robot systems, in particular LWR, allow not only gravity compensation but also the so-called compliance control, in particular a stiffness control, in which the manipulator is to move into a specific nominal position, but allows itself to be moved out of this nominal position by a user or an obstacle. The manipulator is allowed, in the static state, to occupy an actual position that differs significantly from the nominal position. The manipulator outwardly behaves as if it contains a spring, which draws the manipulator from the actual position to the nominal position. In the stiffness control, the corresponding spring constant can be additionally adjusted. As a result of the stiffness or compliance control, the manipulator is able, for example, to apply precisely defined contact forces or process forces to its tool and, accordingly, to the workpiece.

However, up until now, the compliance control options have not been supported in robot programming. The objective of the present invention is therefore to provide an improved apparatus and an improved method for recording positions which supports compliance control.

DETAILED DESCRIPTION OF THE INVENTION

The objective stated above is achieved by means of an apparatus for recording positions in a control program of a manipulator in accordance with claim 1, and by means of a method for recording positions in a control program of a manipulator in accordance with Claim 7.

In particular, the objective stated above is achieved by means of an apparatus for recording positions in a control program of a manipulator, which includes a manipulator, a controller having a control program, and an input device, wherein the controller can actuate the manipulator in a compliance control, in which the manipulator is allowed to occupy an actual position different to the nominal position, wherein the controller, when recording the current position of the manipulator in the control program, carries over the nominal position into the control program if the manipulator was moved by means of the input device into the current position, and wherein the controller, when recording the current position of the manipulator in the control program, carries over the actual position into the control program if the manipulator was manually moved by a user into the current position and, if the manipulator was manually moved by a user into the current position and the movement was limited by the controller, the controller carries over into the control program, when recording the current position of the manipulator in the control program, the nominal components of the current position defined by the limitation together with the actual components of the current position generated by the manual movement of the manipulator by a user.

Because the actual position may differ from the nominal position in the compliance control, it is initially not clear which position should be recorded in the control program in the "touch-up." The apparatus now decides automatically and in a situation-based manner whether the actual position, the nominal position or a combination thereof is recorded, thus preventing user input errors. If the manipulator was moved by means of the input device, for example, a manual control device, into the current position, the manipulator can apply contact forces or process forces to its tool and, accordingly, to the workpiece. When carrying over the manipulator position, set by means of the input device, into the control program, this is taken into account in that the controller in this case automatically carries over the nominal position into the control program. The desired contact forces or process forces will thus be generated even in the subsequent independent execution of the control program.

On the other hand, if the manipulator is manually moved by a user into a desired position, in this case the controller will, in the teaching or touch-up, automatically record the generated current actual position in the control program. The manipulator will thus occupy this position even in the subsequent independent execution of the control program. This is particularly advantageous when exact positioning without the use of contact forces or process forces is required.

If, in the case of the manual movement of the manipulator, a subspace of the movement is simultaneously defined which limits the movement, the controller will automatically record a hybrid position in the control program. This hybrid position comprises the nominal components of the current position defined by the limitation or the subspace and the actual components of the current position generated by the manual movement. The hybrid position thus comprises, on the one hand, the nominal components precisely defined by the limitation and the actual components based on values which are measured, and which are therefore susceptible to measurement errors. This increases the overall precision of the carried over position.

The apparatus, for example, a robot system, thus automatically identifies on the basis of the preceding type of manual movement of the manipulator, which type of position is to be recorded in the control program and stores the corresponding position.

The controller is preferably configured to define a nominal force at the end effector of the manipulator and to move the manipulator by means of the controller in such a way that this nominal force is obtained in the actual position. If the manipulator comes into contact with the surrounding environment, it can apply a force to the surrounding environment in the compliance control. It is possible to define this nominal force with which the manipulator acts on the surrounding environment in the actual position by means of the controller.

The manipulator is preferably configured to measure a force of the end effector of the manipulator when it is moved onto a workpiece. The contact force or process force on the end effector can be directly measured when moving the manipulator both by means of the manual control device and in the case of manual movement. This can be advantageous, for example, if the manipulator is carrying a machining tool, for example, a grinding device, which is to be pressed with a specific force onto the surface to be machined. The user can then manually apply this force, which is then measured and stored in the control program for the corresponding actual position.

The controller is preferably configured to record a desired nominal force for an actual position in the control program. The manipulator can thus be manually moved into the desired actual position in contact with the workpiece and it is then possible to define, for example, by means of the manual controller or by manual application of force, the force that the manipulator is to apply to the workpiece. This means that, for any actual positions whatsoever, contact forces or process forces can be stored, which the manipulator is to apply in the subsequent independent execution of the control program at the respective location.

In the compliance control, a force applied by the manipulator is preferably proportional to the difference between the nominal position and actual position. The manipulator thus behaves in accordance with the spring principle, with the force applied to the surrounding environment being able to be precisely defined.

The proportionality factor for the generation of the force on the basis of the difference between nominal position and actual position is preferably variably adjustable by the controller. The controller can define the virtual spring constant, making the manipulator stiffer or more flexible, and thus precisely adjust the force applied by the manipulator to the surrounding environment with reference to the difference between the nominal position and the actual position.

The controller is preferably configured to record and to store the various directions in which the forces are to act. In particular, the direction in which the force to be recorded is to act can be recorded and stored. It is likewise possible for force lines and their directions to be recorded and stored. For example, a force in the Z direction could thus initially be defined, recorded or stored which however changes over a course of time. The direction and also the magnitude of the force can be changed or can be changeable. Preferably, the position or placement of the end effector and/or of the manipulator can remain unchanged, however it can also change, i.e. a movement can be executed, while the force that is applied is also changed.

In particular, the objective stated above is also achieved by means of a method for recording positions in a control program of a manipulator, which includes the following steps:

a. Controlling of a manipulator in a compliance control, in which the manipulator is allowed to occupy an actual position different to a nominal position;

b. Recording of the current nominal position in the control program if the manipulator was moved by means of an input device, in particular a manual control device, into the current position; and c. Recording of the current actual position in the control program if the manipulator was manually moved by a user into the current position; and d. If the manipulator was manually moved by a user into the current position and the movement was limited by the controller, recording of the current position of the manipulator in the control program using nominal components of the current position defined by the limitation and the actual components of the current position generated by the manual movement of the manipulator by a user.

This method allows an apparatus, for example, a robot system, to automatically identify which type of position is to be recorded in the control program on the basis of the preceding type of manual movement of the manipulator, and it stores the corresponding position. It is taken into account that the manipulator can occupy an actual position different to the nominal position in the compliance control and can then apply a force to the surrounding environment.

The method preferably additionally includes the following steps:
  Definition of a nominal force at the end effector of the manipulator; and
  Movement of the manipulator in such a way that this nominal force is obtained in the actual position.

Thus, by means of the input device or manual control device, for example, a nominal force can be directly defined which the manipulator is to apply to the surrounding environment in a respective actual position. The actual position can then be manually set by means of movement of the manipulator by the user.

The method preferably additionally includes the following step:
  Measurement of a force of the end effector of the manipulator when it is moved onto a workpiece.

The nominal force can also be directly measured if the user manually moves the manipulator and applies a force to the surrounding environment in the touch-up.

The method preferably additionally includes the following step:
  Recording of the nominal force for the corresponding actual position in the control program by the controller.

Thus the nominal force for the corresponding actual position can be stored in the control program and reapplied to the surrounding environment by the manipulator at the respective point in the subsequent independent execution of the control program.

BRIEF DESCRIPTION OF THE DRAWINGS

Preferred embodiments of the invention are explained in detail below with reference to the drawings, in which.

DESCRIPTION OF PREFERRED EMBODIMENTS

Figure 1:
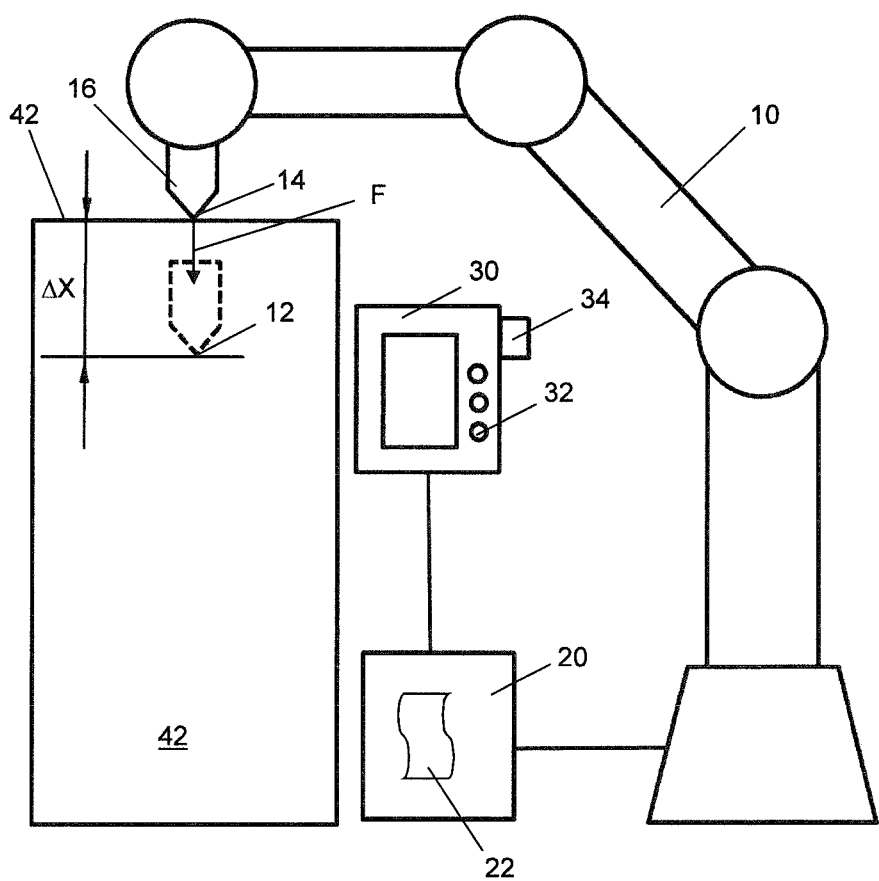
FIG. 1 shows a schematic representation of an exemplary apparatus for recording positions in a control program of a manipulator and a workpiece.

FIG. 1 shows an apparatus 1 for recording positions 12, 14 in a control program 22 of a manipulator 10 upon contact with a workpiece 40. The apparatus 1 comprises a manipulator 10, which is actuated by a controller 20, which can be activated or programmed by a user (not shown) by means of an input device 30, for example a manual control device.

The manipulator 10 additionally comprises several moveable and motor-actuatable axes and an end effector 16. The end effector 16 can be, for example, a gripper, a suction device or another tool, with which the manipulator 10 moves or machines objects, for example. In particular, the end effector 16 can be a tool, for example, a grinding machine, with which the workpiece 40 can be machined.

The input device 30 can include a space mouse 34 and/or keys 32, by means of which the manipulator 10 can be moved to a desired position and programmed by the user.

The manipulator 10 can be a so-called lightweight robot (LWR), which is particularly suitable for assembly operations and lighter machining operations. Internal force sensors in the lightweight robot allow a safe human-robot cooperation thanks to monitoring of the forces occurring.

In particular, the controller 20 can actuate the manipulator 10 in the compliance control, in particular in a Cartesian compliance control, with the manipulator in being allowed to occupy an actual position 14 in the static state, which differs significantly from the nominal position 12. FIG. 1 shows, by way of an example, that the TCP of the end effector 16 is situated at the upper surface 42 of the workpiece 40 at the actual position 14, while the nominal position 12, moved downwards by the amount of the distance $\Delta X$, is situated inside the workpiece 40. For the sake of clarity, the end effector 16 situated in the nominal position 12 is indicated with a broken line. If the workpiece 40 was not present, the manipulator 10 would occupy the nominal position 14.

In the situation depicted in FIG. 1, the manipulator 10 applies a force F to the upper surface 42 of the workpiece 40 with the end effector 16. The manipulator 10 outwardly behaves as if it contains a spring, which draws the manipulator 10 from the actual position 14 to the nominal position 12. The force F is calculated in accordance with the spring principle:

$$F = c^*(X_{Soll} - X_{Ist}) = c^* \Delta X$$

[Translation of formula text: Soil=nominal, Ist=actual]

In the stiffness control, the spring constant c can be additionally adjusted by the controller 20. The manipulator 10 is thus able to apply in the stiffness or compliance control precisely defined contact or process forces F to its end effector 16, for example, a tool, and accordingly, to the workpiece 40.

In the teaching or touch-up, current positions of the manipulator 10 are carried over into a control program 22 of the manipulator 10. The manipulator 10 can either be moved in a conventional manner by means of the input device 30 into the desired position or can be manually moved by the user into the desired position.

The information about the movement type is registered by the controller 20.

If the manipulator 10 is moved to a desired position with the input device 30 by means of a space mouse 34 or by means of keys 32, and a teaching or touch-up is to then occur, the controller 20 carries over the current nominal position 12 into the control program 22. It is thus also possible to set the force F, by means of a keypress or a mouse movement, with which the manipulator 10 is to act on the surrounding environment, in this case, the workpiece 40.

In the example depicted in FIG. 1, the manipulator 10 is initially moved to the position 14, at which the end effector 16 is just touching the upper surface 42 of the workpiece 40. In this position, the manipulator 10 is not yet applying any force F to the workpiece 40. The user can now, for example, by means of the space mouse 34 or an axis movement key, in this case preferably the Z movement key on the input device 30, virtually move the manipulator 10 in the Z direction to the nominal position 12, wherein the end effector 16 does not, however, penetrate the workpiece 40, but instead remains in the actual position 14. Thanks to the virtual movement the manipulator is now "pre-loaded" and applies a precisely defined force F, which can be calculated in accordance with the spring principle, to the workpiece 40. With the teaching or touch-up of the nominal position 12, at a defined spring constant c, the force F is thus implicitly also recorded in the control program 22.

As an alternative to the virtual movement of the manipulator 10 to apply a force F, the manipulator can also be moved to the actual position 14 or manually moved thereto, and then a nominal force $F_{nominal}$ desired there can be defined via the input device 30. The manipulator 10 is then virtually moved onto the workpiece or pre-loaded according to this nominal force $F_{nominal}$, so that the desired nominal force $F_{nominal}$ is obtained. The movement path is, in turn, defined according to the spring principle. In this case too, in the teaching or touch-up, the nominal position 12 resulting from the nominal force $F_{nominal}$ is recorded in the control program 22 and thus, at a defined spring constant c, the force F is implicitly also stored. The user can preferably also define a direction or direction curve for the force F or nominal force $F_{nominal}$, in which said force is to act.

Alternatively, in the case of the force definition, the actual position 14 and the desired force $F_{nominal}$ can also be stored and the controller 20 can then calculate from this information, in the subsequent independent execution of the control program 22, the required nominal position 12 based on the spring principle.

If the manipulator 10 is manually moved by a user to a desired position, and a teaching or touch-up is to then occur, the controller 20 carries over the current actual position 12 into the control program 22. The controller assumes that the user normally does not want to apply any force to the surrounding environment with the manipulator 10. However, if the manipulator 10 is configured to measure a force F of the end effector 16 when it is moved onto a workpiece 40, in the teaching or touch-up for the current actual position 14, the measured force F can also be recorded as nominal force $F_{nominal}$ in the control program 22.

It is additionally possible that, in the teaching or touch-up, the manual movement option of the TCP was limited for the end effector 16 by a subspace of the movement. For example, the TCP could be moved in the Z direction by means of the input device 30 in such a way that it applies a defined force F to the workpiece 40. This Z component should subsequently be maintained exactly the same, even in the case of a manual movement. The orientation of the TCP or tool could also be precisely defined. Then the movement of the manipulator in the X-Y plane of the upper surface 42 could be enabled and the manipulator could be manually moved by the user in this X-Y plane. In a subsequent teaching or touch-up, a hybrid position is now recorded in the control program 22, which position is made up of the precisely defined Z component, the precisely defined solid angles A, B and C, i.e. the nominal components, and the measured values for the X and Y components, i.e. the actual components.

Figure 2:
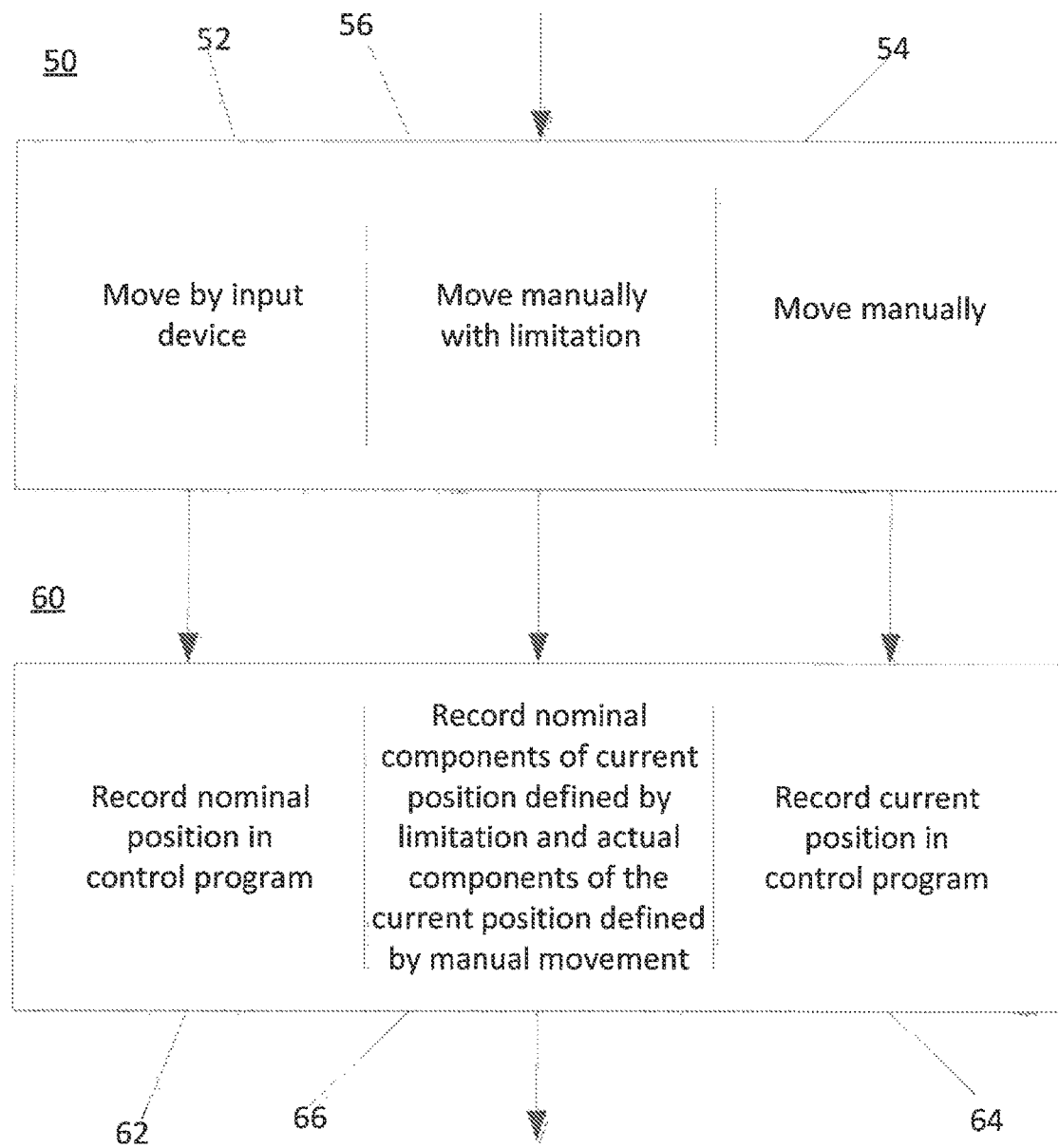
FIG. 2 shows a sequence diagram of an exemplary method for recording positions in a control program of a manipulator.

FIG. 2 illustrates an exemplary method for recording positions 12, 14 in a control program 22 of a manipulator 10 by means of a sequence diagram.

In a step 50, the manipulator 10 is controlled in the compliance control, in which the manipulator 10 is allowed to occupy an actual position 14 different to a nominal position 12. The manipulator 10 can either be moved by means of an input device 30 into the current position in sub-step 52, or can be moved manually by the user into the current position in sub-step 54.

In the teaching or touch-up, the current position is recorded in the control program 22 in a step 60, while in sub-step 62 the nominal position 12 is recorded if the manipulator 10 was moved by means of the input device 30 into the current position. In an alternative sub-step 62, the current actual position 14 is recorded in the control program 22 if the manipulator 10 was manually moved by a user into the current position. As another alternative, in a sub-step 66, a hybrid position composed of nominal and actual components can be recorded in the control program 22 if the manipulator 10 was manually moved by a user into the current position and the movement was limited by the controller 20.

It should be noted that the invention claimed herein is not limited to the described embodiments, but may be otherwise variously embodied within the scope of the claims listed infra.

REFERENCE NUMERAL LIST

1 Apparatus
10 Manipulator
12 Nominal position
14 Actual position
16 End effector
20 Controller
22 Control program
30 Input device
32 Keys
34 Space mouse
40 Workpiece
42 Upper surface
50 Control step in compliance control
52 Movement by means of manual control device
54 Manual movement
60 Recording of the position
62 Recording of the nominal position
64 Recording of the actual position
66 Recording of a hybrid position

The invention claimed is:

1. An apparatus for recording positions in a control program of a manipulator, which includes:
   the manipulator;
   a controller having the control program; and
   an input device;
   wherein the controller is configured to actuate the manipulator in a compliance control, in which the manipulator is allowed to occupy an actual position different from a nominal position;
   wherein the controller is configured when recording a current position of the manipulator in the control program to select components of one or more of the nominal position or the actual position of the manipulator to be carried over into the control program, the components selected as a function of a mode by which the manipulator is moved to the current position, and
   wherein the controller is configured, when the mode by which the manipulator is moved is a hybrid mode in which the manipulator is manually moved into the current position and movement is limited by the controller, to select and carry over into the control program the nominal components of the current position defined by the limitation together with actual components of the current position generated by the manual movement of the manipulator.

2. The apparatus according to claim 1, wherein the controller is configured to define a nominal force ($F_{nominal}$) at an end effector of the manipulator and to move the manipulator by means of the controller in such a way that this nominal force ($F_{nominal}$) is obtained in the actual position.

3. The apparatus according to claim 1, wherein the manipulator is configured to measure a force (F) of an end effector of the manipulator when it is moved onto a workpiece.

4. The apparatus according to claim 2, wherein the controller is configured to record in the control program the nominal force ($F_{nominal}$) for the corresponding actual position.

5. The apparatus according to claim 1, wherein, in the compliance control, a force (F) applied by the manipulator is proportional to a difference between the nominal position and the actual position.

6. The apparatus according to claim 5, wherein the force (F) is determined as a function of the difference between the nominal position and the actual position and a proportionality factor (c) is variably adjustable by the controller
wherein the force (F) is determined as a function of the difference between the nominal position and the actual position and a proportionality factor (c) that is variably adjustable by the controller.

7. The apparatus according to claim 1, wherein the controller is configured to record and to store directions in which forces (F, $F_{nominal}$) are to act.

8. The apparatus according to claim 1, wherein the controller is configured to record and to store force vectors.

9. A method for recording positions of a manipulator in a control program of a controller of the manipulator, comprising the steps of:
controlling a manipulator in a compliance control, in which the manipulator is allowed to occupy an actual position different from a nominal position in current position;
selecting components of one or more of the nominal position or the actual position of the manipulator to be carried over in the control program as a function of a mode by which the manipulator is moved to the current position; and
recording the selected position in the control program,
wherein the mode is a hybrid mode in which the manipulator is manually moved into the current position and movement is limited by the controller, and the controller selects nominal components of the current position defined by the limitation together with actual components of the current position generated by the manual movement of the manipulator.

10. The method according to claim 9, additionally comprising:
defining a nominal force ($F_{nominal}$) at an end effector of the manipulator; and
moving the manipulator in such a way that this nominal force ($F_{nominal}$) is obtained in the actual position.

11. The method according to claim 9, additionally comprising:
measuring a three ($F_{nominal}$) of an end effector of the manipulator when it is moved onto a workpiece.

12. The method according to claim 9, additionally comprising:
recording a nominal force (F) at the actual position in the control program by the controller.

13. The method according to claim 9, wherein, in the compliance control, a force (F) applied by the manipulator is proportional to a difference between the nominal position and the actual position.

14. The method according to claim 13, wherein the force (F) is determined as a function of the difference between the nominal position and the actual position and a proportionality factor (c) that is variably adjustable by the controller.

15. The apparatus according to claim 1, wherein the controller is configured, when the mode by which the manipulator is moved is moving the manipulator by means of the input device into the current position, to select and carry over the nominal position of the manipulator into the control program.

16. The apparatus according to claim 1, wherein the controller is configured, when mode by which the manipulator is moved is manually moving the manipulator into the current position, to select and carry over components of the actual position of the manipulator into the control program.

* * * * *